United States Patent Office.

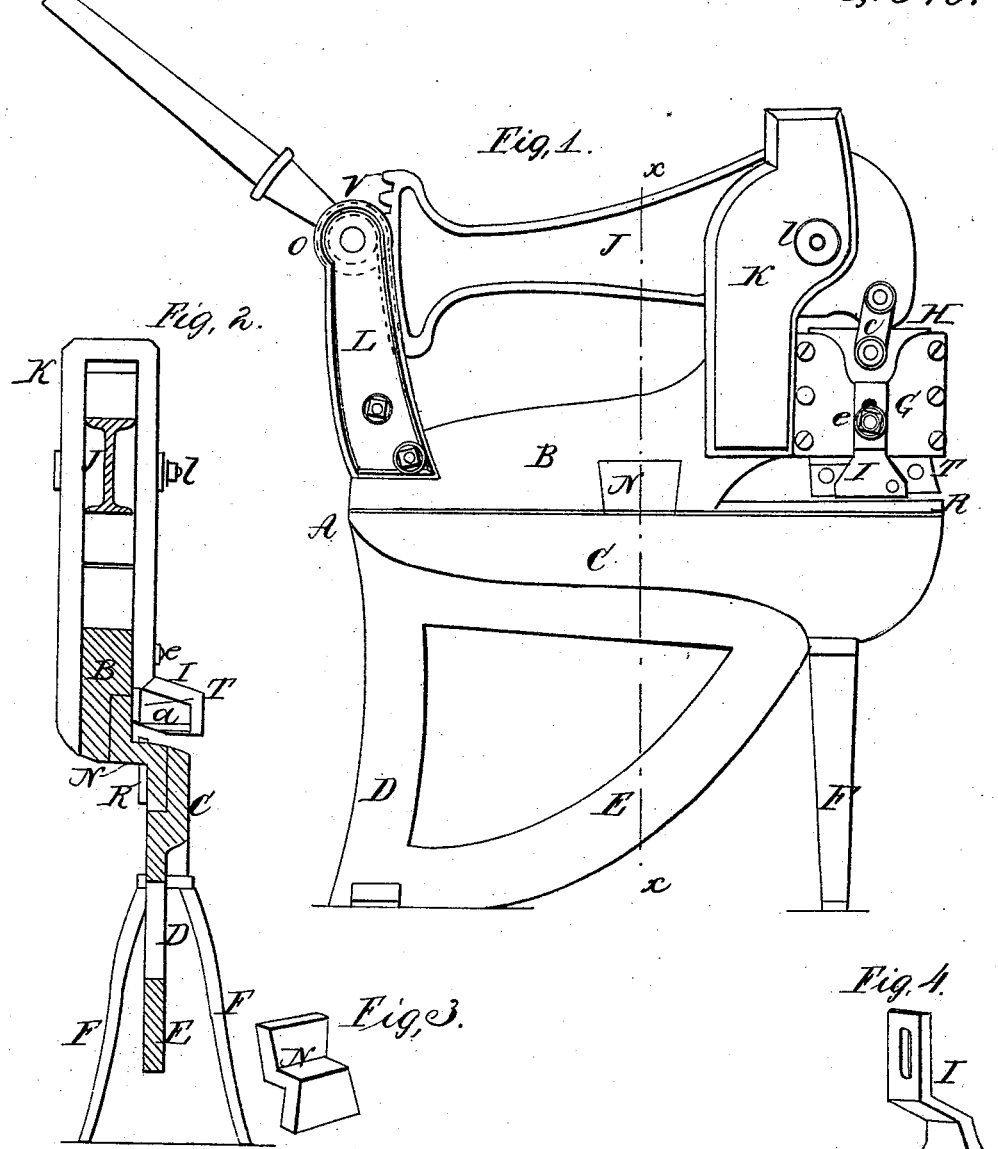

ELLIS DOTY AND H. RICHARDSON, OF JANESVILLE, WISCONSIN, ASSIGNORS TO DOTY MANUFACTURING COMPANY, OF SAME PLACE.

Letters Patent No. 101,356, dated March 29, 1870.

IMPROVED MACHINE FOR SHEARING METAL.

The Schedule referred to in these Letters Patent and making part of the same.

*To all whom it may concern:*

Be it known that we, ELLIS DOTY and H. RICHARDSON, of Janesville, in the county of Rock and State of Wisconsin, have invented certain new and useful improvements in Machines for Shearing Metal Plates; and we do hereby declare that the following is a full, clear, and exact description thereof, reference being had to the accompanying drawings making part of this specification, and to the letters of reference marked thereon, like letters indicating like parts wherever they occur.

To enable others skilled in the the art to construct and use our invention we will proceed to describe it.

Our invention relates to machines for shearing metal, and the invention consists in a novel manner of constructing the frame, and in a guide for regulating the position of the piece to be cut.

Figure 1 is a side elevation of our improved machine complete.

Figure 2 is a transverse vertical section on the line x-x of fig. 1, looking toward the front.

Figures 3 and 4 are perspective views of portions shown detached.

The object of our invention is to produce a machine in which wide sheets of metal can be cut with facility and with accuracy, and that shall possess the requisite degree of strength.

In machines of this character it is necessary that the frame should be made very strong, and it is desirable to so construct the frame that a sheet of any width may be cut, and the cut made of any length desired, and the sheet prevented from curling or bending.

To accomplish these results we make a frame, A, of cast-iron, with an offset along its center, in line with the point where the blades meet, as represented in fig. 2, the upper part B of the frame being at one side of the vertical plane in which the shear blades meet, and the lower part C being on the opposite side thereof, the stationary blade R being secured to the inner side of the lower part C, and the movable blade T being secured to a sliding block H which works in a box frame G secured to the upper part B, as shown fig. 1, the blade T being at the inner side of the part B of the frame A.

The object of constructing the frame A with the offset in this manner is to permit a plate, when cut by the shears, to be slid back on the frame—one part of the plate resting on the top of the part C, while the other part of the plate slides along under the part B, and thus to continue the cut by repeated operations to any required extent. As this manner of constructing the frame renders it liable to break along the line where the parts B and C are joined, it becomes necessary to strengthen it there without adding to its thickness, and to accomplish this we provide a piece of wrought iron or steel, of the form showed in fig. 3, or any other suitable form, and insert it in the mold in such a position that when the frame A is formed the piece N shall be imbedded therein, in the manner shown in figs. 1 and 2—this part, N, being located near the front end of the union of the parts B and C, where the strain is greatest.

It is obvious that the piece N may be inserted in recesses made for it in the frame after the latter is cast, but we prefer the other as the better plan.

By this means we render the frame sufficiently strong to withstand the great strain upon it, and at the same time keep it of the form and size necessary to permit the sheet to be shoved back as it is cut by the blades.

To prevent the sheet from bending or curling up as it is cut, we secure to the side of box-head G a brace, I, shown detached in fig. 4, it being secured by a bolt, e, passing through a slot therein, by which it can be adjusted vertically, as may be necessary. The lower end of this piece, I, holds the part of the sheet on that side down, and prevents it from curling up, or twisting, as it otherwise would.

To the inner face of this brace, I, is secured a pin, a, the inner end of which comes directly over or even with the edge of the lower blade R, and which thus serves as a guide for placing the sheet to be cut. By making a mark on the sheet where it is to be cut, and bringing the heel of the upper blade down on the sheet at the mark, and then bringing the mark on the sheet at the point of the pin, a, the sheet will be in a position to insure the cut being made along the line of the mark, and thus, as the sheet is shoved along after each cut, and while the lower blade is hid from view, the pin serves as a guide, by which the cut may be continued in a straight line.

To the part B of the frame, at the front, is secured an upright frame, K, in which is pivoted a strong lever, J, on a bolt, l, this lever J extending back over the top of the frame, as shown in fig. 1. This lever, at its rear end, is provided with a segmental rack, in which engages a pinion, V, pivoted or journaled between uprights, L, secured to the rear end of the frame, as shown in fig. 1, the pinion being provided with a lever, by which it is operated.

To the front end of the lever J, the sliding block H, to which is secured the upper or movable cutting-blade, is connected by means of links, c, so that, as the lever J is operated by the lever and pinion, the block H, with its blade T, is raised or lowered with great power.

From the lower edge of the frame A there extends downward a leg, D, with a brace, E, which serves to support the machine at the rear, and also acts as a brace to strengthen the frame, while at the front are two legs, F, as represented in figs. 1 and 2. These parts may be cast solid with the frame, or they may be made separately and bolted on, as may be found most convenient.

With a machine thus constructed it will be seen that we secure great strength and power, and that a sheet of any width may be cut, and that the cut may be extended any distance desired.

If desired a pin or arm, *m*, may be secured to the lower part, B, as shown in red in fig. 1, for that part of the sheet to rest upon, which when cut passes under the part B, and is thus held up, and also kept from curling or twisting.

Having thus described our invention, what we claim is—

1. The insertion of the steel or wrought-iron plate N into the cast-iron frame, in the manner herein described, for the purpose of strengthening the same substantially as set forth.

2. In combination with the shearing-machine constructed substantially as described, the adjustable dog or brace I, when constructed and arranged as set forth.

3. The pin *a*, arranged in relation to the blade R to operate as a guide, substantially as set forth.

ELLIS DOTY.
H. RICHARDSON.

Witnesses:
R. I. RICHARDSON,
H. A. DOTY.